(12) United States Patent
Cresswell (10) Patent No.: US 7,628,218 B2
(45) Date of Patent: Dec. 8, 2009

(54) APPARATUS FOR ATTACHING A GROUND-ENGAGING TOOL TO AN IMPLEMENT FRAME

(75) Inventor: Mark Cresswell, St. Brieux (CA)

(73) Assignee: Roynat Inc., Calgary, Alberta (CA)

( * ) Notice: Subject to any disclaimer, the term of this patent is extended or adjusted under 35 U.S.C. 154(b) by 388 days.

(21) Appl. No.: 11/212,953

(22) Filed: Aug. 26, 2005

(65) Prior Publication Data

US 2006/0000622 A1 Jan. 5, 2006

Related U.S. Application Data

(63) Continuation-in-part of application No. 10/621,592, filed on Jul. 17, 2003, now abandoned.

(51) Int. Cl.
*A01B 39/20* (2006.01)
*A01B 15/16* (2006.01)

(52) U.S. Cl. .................................... 172/763; 172/566

(58) Field of Classification Search ................. 172/175, 172/298, 538, 566, 624.5, 764, 705, 763, 172/773, 774, 775; 111/18, 118, 189, 190, 111/194, 195, 197, 926, 927; 248/276.1, 248/284.1

See application file for complete search history.

(56) References Cited

U.S. PATENT DOCUMENTS

| | | | | |
|---|---|---|---|---|
| 366,667 A * | 7/1887 | Jelinsky | ...................... | 172/365 |
| 404,108 A * | 5/1889 | Patric | .......................... | 111/66 |
| 1,020,681 A * | 3/1912 | Binns | ............................ | 111/52 |
| 1,237,508 A * | 8/1917 | Griffice | ........................ | 172/763 |
| 1,412,615 A * | 4/1922 | Johnson | ....................... | 172/705 |
| 4,564,075 A * | 1/1986 | Chekouras | ................... | 172/572 |
| 4,834,189 A * | 5/1989 | Peterson et al. | ............. | 172/166 |
| 4,947,770 A * | 8/1990 | Johnston | ..................... | 111/121 |
| 5,027,724 A * | 7/1991 | Ptacek et al. | ................. | 111/121 |
| 5,219,146 A * | 6/1993 | Thompson | ..................... | 251/7 |
| 5,452,768 A * | 9/1995 | Koberlein | ..................... | 172/76 |
| 5,555,824 A * | 9/1996 | Stufflebeam et al. | .......... | 111/62 |
| 5,562,055 A * | 10/1996 | Petersen | ....................... | 111/195 |
| 5,910,192 A * | 6/1999 | Pulford et al. | ............ | 74/479.01 |
| 6,024,179 A * | 2/2000 | Bourgault | ..................... | 172/566 |
| 6,164,386 A * | 12/2000 | Delaurier | ..................... | 172/622 |
| 6,216,616 B1 * | 4/2001 | Bourgault | .................... | 111/186 |
| 6,237,697 B1 * | 5/2001 | Butterfield et al. | .......... | 172/566 |
| 6,260,632 B1 * | 7/2001 | Bourgault et al. | ............ | 172/566 |
| 6,659,193 B1 * | 12/2003 | Best et al. | .................... | 172/566 |
| 2003/0164125 A1 * | 9/2003 | Paluch et al. | ................... | 111/56 |

* cited by examiner

*Primary Examiner*—Thomas B Will
*Assistant Examiner*—Matthew D Troutman
(74) *Attorney, Agent, or Firm*—Frost Brown Todd LLC (57) ABSTRACT

An apparatus for attaching a ground-engaging tool to an implement frame of an implement adapted to move along the ground in an operating travel direction includes a bore bracket defining a pair of laterally spaced parallel cylindrical bores, and a pair of cylindrical shafts, one shaft slidingly engaged in each bore such that the shafts are maintained in a parallel orientation. The shafts are connected such that the shafts slide in the bores substantially in unison. An adjustable stop is operative to prevent the shafts from sliding in the bores. One of the bore bracket and pair of shafts is adapted for rigid attachment to the implement frame such that the bores and shafts are oriented substantially upright, and the other of the bore bracket and pair of shafts is adapted for attachment thereto of a ground-engaging tool.

19 Claims, 8 Drawing Sheets

APPARATUS FOR ATTACHING A GROUND-ENGAGING TOOL TO AN IMPLEMENT FRAME

This application is a continuation-in-part of U.S. patent application Ser. No. 10/621,592, filed on Jul. 17, 2003 now abandoned APPARATUS FOR ATTACHING A GROUND-ENGAGING TOOL TO AN IMPLEMENT FRAME.

This invention is in the field of agricultural ground working implements, and in particular mechanisms for attaching a ground-engaging tool to a frame.

BACKGROUND OF THE INVENTION

Ground-engaging tools such as furrow openers and cultivating tools are well known for mounting on an implement frame for use in agricultural field operations. It is a main objective of such implements to have the ground-engaging tools of the implement extend the same distance into the ground across the width of the implement so that the soil is worked at an even depth across the whole field.

While the working depth is important for all ground working implements, it is particularly important for furrow openers on seeding and fertilizing implements where the depth and placement of seed and fertilizer can affect the yield of the seeded crop.

Such ground-engaging tools are typically mounted on an arm or shank that is attached to the implement frame. In one configuration the arm extends rearward and is pivotally mounted to the frame. A ground following depth wheel is placed at the end of the arm and a spring or similar bias element exerts a downward force on the arm to maintain the depth wheel in contact with the ground. The furrow opener extends downward just ahead of the depth wheel, and the furrow opener is maintained at a substantially constant depth by the depth wheel which can move up and down with respect to the frame as ground contours vary. In such a configuration, the height of the implement frame above the ground should also be maintained substantially constant as well since the working depth of the furrow opener depends on both the height above the ground of the front end of the arm, attached to the frame, and the height above the ground at the rear end, attached to the wheel. Mounting the furrow opener as near to the depth wheel as possible, however, reduces the effect of the front end height, and maximizes the depth control provided by the depth wheel.

Such a ground following configuration is disclosed in U.S. Pat. No. 5,752,454 to Barton where the furrow opener is a disc type furrow opener, and U.S. Pat. No. 5,396,851 to Beaujot where the furrow opener is a hoe type furrow opener. In narrow configurations the hoe-type opener is often referred to as a knife opener. Both types of furrow openers are commonly used in agriculture. Such individual ground following furrow openers provide somewhat improved depth control but are relatively complex and costly and require considerable maintenance. Each furrow opener must also be adjusted individually to change the furrow depth, requiring considerable time and often substantial effort as well, depending on the adjusting mechanism.

In a more common configuration, the ground-engaging tools are mounted to the implement frame at a fixed working distance below the frame such that the working depth of the ground-engaging tools is determined solely by the tool's distance below the frame. The frame is mounted on ground following frame wheels and leveled such that the frame is substantially the same height above the ground across its width as it moves along the field. The tools then work the ground at an even depth. To vary the working depth, or to disengage the tools from the ground, the frame wheels are raised or lowered with respect to the frame, thereby varying the distance between the frame and the ground. Thus in this configuration the ground working or furrow depth is more readily adjusted as individual adjustment of each tool or furrow opener is not required.

In this fixed configuration, the ground-engaging tools are typically mounted at the lower end of an arm or shank that has an upper end thereof attached to the frame. In this fixed configuration, the arm is also typically pivotally attached to the frame as in the ground following configuration with a depth wheel as described above. In this fixed configuration, however, the pivotal attachment is only provided so that the ground-engaging tool may move upward from a normal working position to clear obstacles, such as rocks or the like, that may be encountered in the field. Such a fixed configuration is disclosed in U.S. Pat. No. 6,237,697 to Butterfield et al.

In the working position, the arm is maintained at a fixed downward location by a heavy bias force that maintains the downward location in normal soil conditions until an obstacle is encountered that exerts a sufficient force on the arm to overcome the bias force and move back and up to clear the obstacle. Once the obstacle is cleared, the arm is again forced down to the working position. It is also known to provide implements with the fixed configuration wherein the arm is rigidly fixed to the frame and there is no provision for clearing obstacles.

The Butterfield '697 patent also discloses a typical adjustable mechanism for mounting the upper end of the arm to an implement frame such that the distance between the furrow opener and the frame can be adjusted. Such an adjustment allows for some chosen furrow openers to be lower or higher than others to compensate for furrow opener wear, working in hard packed wheel tracks, and such other anomalies as are found across the width of a seeding implement.

Furrow openers must be maintained at a constant and correct orientation with respect to the operating travel direction in order to cut a satisfactory furrow. Openers with a hoe-type ground-engaging element for example are generally oriented at an operating angle of zero, while typical disc-type openers are oriented at an angle of between 4 and 12 degrees. Especially when the furrow opener is working in the relatively hard un-tilled soil of a no-till seeding operation, the ground-engaging element can encounter considerable forces which tend to move the element out of the proper orientation. As an example, a typical disc furrow opener for use in no-till seeding can be oriented at a small angle of approximately 4 degrees with a preferred tolerance of 0.5 degrees. An apparatus for mounting this furrow opener must then provide considerable strength to maintain that tolerance in hard soil.

In order to maintain this orientation conventional implements typically employ members with a square or rectangular cross section that are mated and clamped to provide engagement that will hold the furrow opener rigid and resist twisting out of the desired orientation. Such a typical mechanism is illustrated in Butterfield '697, where once the arm is moved to the desired vertical position, bolts are placed through appropriate holes and tightened so that the arm flanges with the mounting holes are clamped to the frame mounting member.

Clamping is required to keep the furrow opener rigid with respect to the frame to maintain the proper operating angle on the opener. Using commercially economical manufacturing processes, the sliding fit between the flanges and the frame mounting member is not sufficiently close to maintain the angle within the required tolerances.

U.S. Pat. No. 4,909,335 to Walt, Jr. discloses a mechanism for adjusting the vertical position of a ground-engaging tool with respect to an implement frame. The mechanism comprises a square tube attached to a cultivating tool that slides inside another square tube that is attached to the implement frame. A screw is operative to move the inside tube up and down with respect to the outer tube in order to adjust the vertical position of the ground-engaging tool with respect to the frame.

In Walt, Jr., the implement is a cultivating implement wherein precise orientation with respect to the operating travel direction is not as critical as it is with furrow openers that deposit seed, and in particular disc type furrow openers wherein the angle of the disc with respect to the operating travel direction must be maintained within a tight tolerance to provide satisfactory furrow forming and seed placement. While the tubes in the apparatus of Walt could be manufactured to sufficient precision to provide the required degree of precision to maintain a furrow opener at the required angle, such tubes are not commercially available but must be specially manufactured at significant cost. Thus a slidable adjustment mechanism such as disclosed in Walt, Jr. is not economically viable for furrow openers.

Cylindrical shafts with a circular cross section are manufactured with considerable precision and are commercially available at a reasonable cost. Such cylindrical shafts are much more easily made to precise specifications since they can be turned on a lathe or the like. Such cylindrical shafts are mass-produced for use in hydraulic cylinders, and are also chrome plated to resist corrosion, and so are available at reasonable cost. Similarly corresponding cylindrical bores are readily made in brackets or the like so that the shaft can be slidably received in the bore with very close tolerances, such as would provide for the precision control of furrow openers.

Such cylindrical shafts alone however cannot resist twisting since they will rotate as well as slide in the bore unless a groove or keyway, and corresponding key are provided. Considerable twisting forces can be exerted on furrow openers, such that a large diameter shaft and large keyway and key would need to be provided to maintain a furrow opener at the desired orientation under field conditions. The bracket with the bore must be sized and shaped accordingly as well. The resulting adjustment mechanism would be costly, and not likely economical for use in agricultural implements.

SUMMARY OF THE INVENTION

It is an object of the present invention to provide an apparatus for attaching a ground-engaging tool to an implement frame of an implement adapted to move along the ground in an operating travel direction that overcomes problems in the prior art. It is a further object of the present invention to provide such a commercially economical apparatus that maintains the ground-engaging tool at a desired operating angle with respect to the operating travel direction, while allowing the ground-engaging tool to be conveniently raised or lowered with respect to the frame.

It is a further object of the present invention to provide such an apparatus comprising a pair of parallel shafts sliding in bores attached to the implement frame. The ground-engaging tool, for example a furrow opener, is attached to both shafts such that twisting is resisted, while at the same time the shafts can be moved up or down in the bores to vary the distance of the ground-engaging tool below the frame. A stop fixes the position of the shafts with respect to the frame.

The present invention provides, in one embodiment, an apparatus for attaching a ground-engaging tool to an implement frame of an implement adapted to move along the ground in an operating travel direction. The apparatus comprises a bore bracket defining a pair of laterally spaced parallel cylindrical bores, and a pair of cylindrical shafts, one shaft slidingly engaged in each bore such that the shafts are maintained in a parallel orientation. The shafts are connected such that the shafts slide in the bores substantially in unison. An adjustable stop is operative to prevent the shafts from sliding in the bores. One of the bore bracket and pair of shafts is adapted for rigid attachment to the implement frame such that the bores and shafts are oriented substantially upright, and the other of the bore bracket and pair of shafts is adapted for attachment thereto of a ground-engaging tool.

In a second embodiment the invention provides an agricultural implement apparatus adapted to move along the ground in an operating travel direction. The apparatus comprises an implement frame comprising a frame bore member defining first and second laterally spaced parallel cylindrical bores oriented substantially upright. A first cylindrical shaft is slidingly engaged in the first bore and a second cylindrical shaft is slidingly engaged in the second bore such that the shafts are maintained in a parallel, substantially upright orientation. An adjustable stop is operative to prevent the shafts from sliding in the bores. An opener bracket is attached to a lower portion of the first shaft and is attached to a lower portion of the second shaft such that the first and second shafts slide in the bores in unison, and is attached to a furrow opener such that the furrow opener is substantially oriented at an operating angle with respect to the operating travel direction. A depth of penetration of the furrow opener into the ground is adjusted by adjusting the stop to change a position of the shafts with respect to the frame bore member.

In a third embodiment the invention provides an agricultural implement apparatus adapted to move along the ground in an operating travel direction. The apparatus comprises an implement frame, and first and second cylindrical shafts fixed to the implement frame such that the shafts are parallel to each other and extend downward from the implement frame in a substantially upright orientation. A bore bracket defines first and second laterally spaced parallel cylindrical bores and is slidingly engaged on the shafts such that the first shaft is in the first bore and the second shaft is in the second bore and the bore bracket can slide along the shafts. An adjustable stop is operative to prevent the bore bracket from sliding along the shafts. A furrow opener is attached to the bore bracket such that the furrow opener is substantially oriented at an operating angle with respect to the operating travel direction. A depth of penetration of the furrow opener into the ground is adjusted by adjusting the stop to change a position of the bore bracket with respect to the shafts.

Precision fit of cylindrical shafts and bores is economically accomplished compared to the flat-sided members of prior art attachment mechanisms. By using two cylindrical shafts maintained parallel by the fixed bores, the ground-engaging tool is maintained at the correct operating angle within the required tolerances, without clamping as in the prior art. The shafts can be configured so that as a disc furrow opener penetrates further into the ground, the operating angle is reduced, maintaining a more satisfactory furrow width. Either the shafts or the bore bracket can be fixed to the implement frame, and the furrow opener or other ground engaging tool can be attached to the other of the shafts or the bore bracket.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
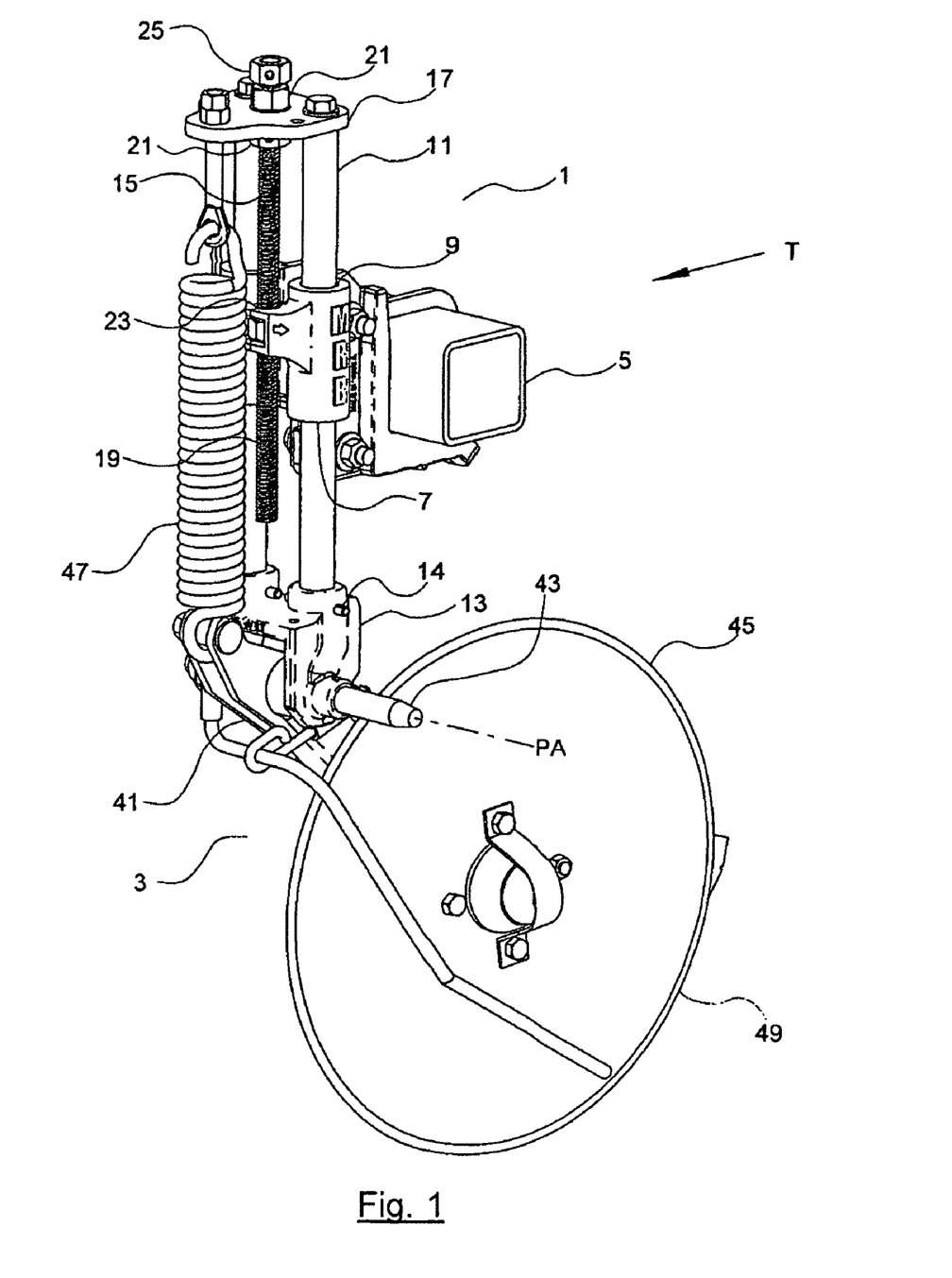
FIG. 1 is a front left perspective view of an embodiment of the invention.
Figure 2:
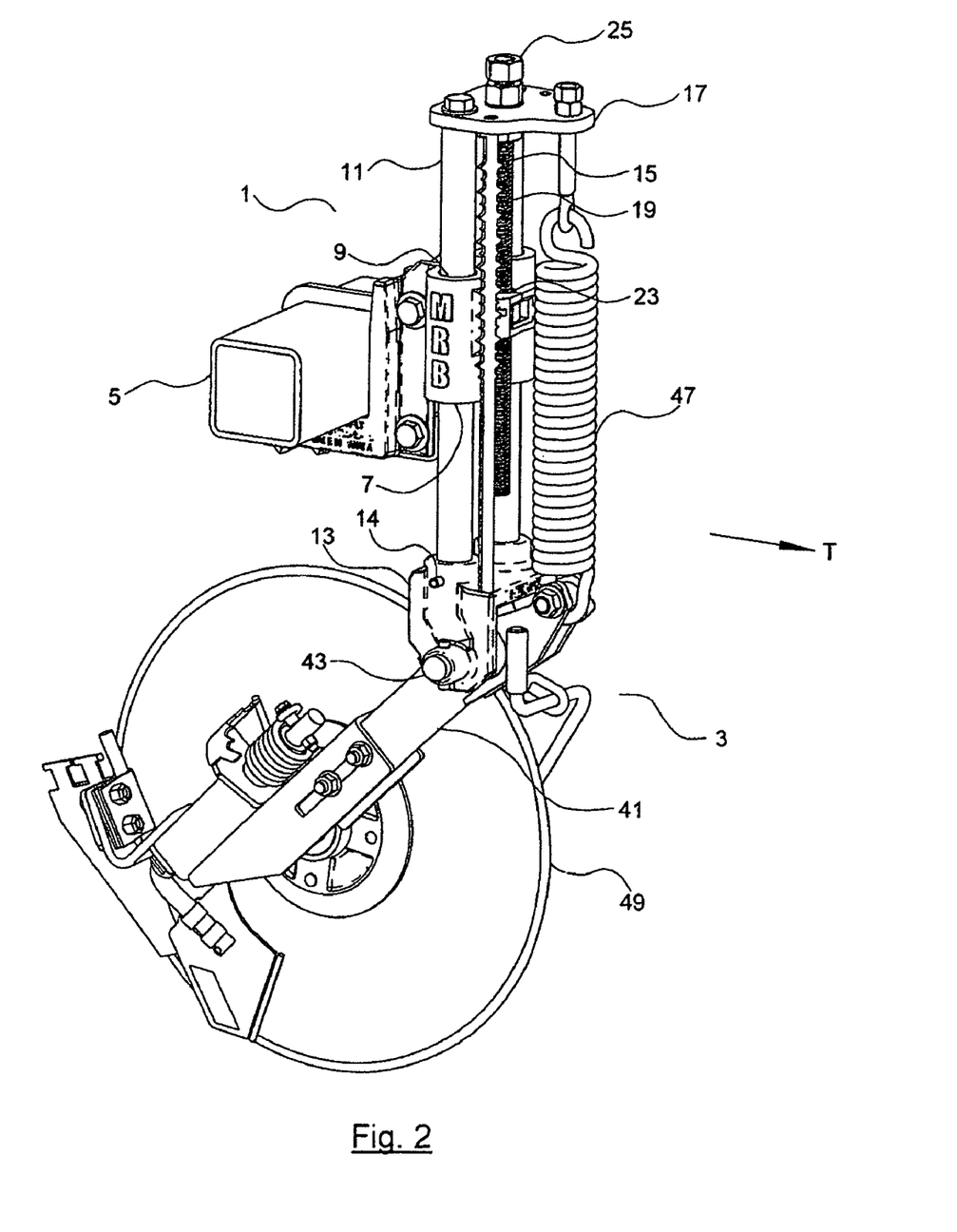
FIG. 2 is a front right perspective view of the embodiment of FIG. 1.

FIGS. 1 and 2 illustrate an apparatus 1 for attaching a ground-engaging tool, shown as a furrow opener 3, to an implement frame 5 of an implement. The implement is adapted to move along the ground in an operating travel direction T as is well known in the agricultural industry for performing various field operations. The apparatus 1 is suitable for attaching various ground-engaging tools to an implement however provides accuracy in both vertical and lateral positioning that is particularly desirable in seeding implements where the ground-engaging tool is a furrow opener.

The apparatus comprises a bore bracket 7 defining a pair of laterally spaced parallel cylindrical bores 9. In the illustrated embodiment of FIGS. 1 and 2, the bore bracket 7 is adapted for rigid attachment to the implement frame 5 such that the bores 9 are oriented substantially upright as illustrated. Alternate frame bore members defining such bores 9 could also be incorporated into the frame 5 in other ways that will occur to those skilled in the art.

The apparatus 1 also comprises a pair of cylindrical shafts 11, one shaft 11 slidingly engaged in each bore 9 such that the shafts 11 are maintained in a parallel substantially upright orientation by the bore bracket 7.

Figure 10:
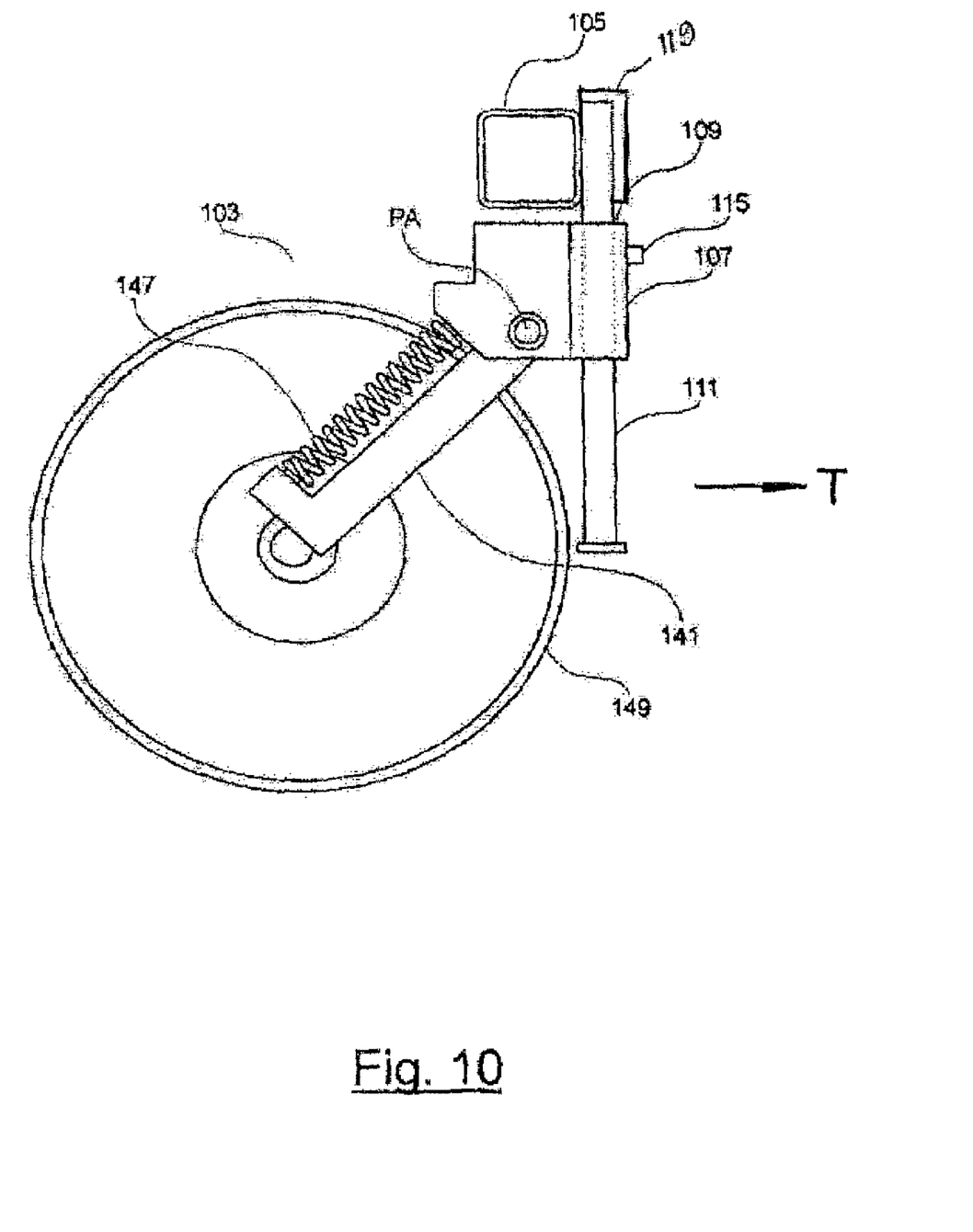
FIG. 10 is a schematic side view of an alternate embodiment of the invention.

Alternatively, as described below and as illustrated in FIG. 10, cylindrical shafts 111 can be adapted for rigid attachment to the implement frame 105, with the bore bracket 107 slidable up and down on the shafts 111.

An opener bracket 13 is attached to a lower portion of both shafts 11 such that an attached furrow opener 3 is oriented at an operating angle with respect to the operating travel direction T. The opener bracket 13 also connects lower ends of the shafts 11 such that the shafts 11 slide in the bores 9 substantially in unison. A roll pin 14 extends through corresponding holes in the shaft 11 and opener bracket 13 to attach each shaft to the opener bracket.

An adjustable stop 15 is operative to prevent the shafts 11 from sliding in the bores 9 and thus selectively fix the position of the shafts 11 with respect to the bore bracket 7. Conveniently the stop 15 comprises a link member attachable to the bore bracket 7 and at least one of the shafts 11. In the embodiment illustrated in FIGS. 1 and 2, an upper shaft bracket 17 is attached to the upper ends of both shafts 11 and the link member is an extendible screw actuator 19 attached to the upper shaft bracket 17 and the bore bracket 7.

The top end of the screw actuator 19 is maintained in a fixed position with respect to the upper shaft bracket 17 by lock nuts 21 above and below the upper shaft bracket 17 which allow the screw actuator 19 to rotate in a threaded hole 23 in the bore bracket 7. Rotating the screw actuator 19 thus effectively changes the length of the link member between the upper shaft bracket 17, which is attached to the shafts 11, and the bore bracket 7, and moves the furrow opener 3 up or down with respect to the frame 5.

An impact wrench or the like can be applied to the head 25 of the screw actuator 19 to allow convenient and fast movement from a working position to a fully raised non-working position. Alternately the screw actuator 19 could be rotated electrically, or other extendible actuators such as pneumatic or hydraulic cylinders or the like could be used that could be controlled remotely from an operator's position on a tractor.

The extendible actuators, such as screw actuator 19, readily move the furrow opener 3 up and down with respect to the frame to vary the depth of penetration of the furrow opener 3 into the ground. The precision sliding fit of the cylindrical shafts 11 in the cylindrical bores 9 is such that there is substantially no lateral movement while sliding movement is allowed. Since there is no lateral movement of the shafts 11 with respect to the bore bracket 7, no clamping is required as in conventional sliding adjustment mechanisms using square, rectangular, and like flat-sided members engaging each other to prevent twisting. The cylindrical bores 9 are economically manufactured and cylindrical shafts 11 are commercially available in various sizes to suit particular applications.

In the apparatus of the invention, the orientation of the furrow opener 3 at the operating angle to the operating travel direction T is maintained by attaching the furrow opener 3 to two cylindrical shafts 11 that are maintained at a fixed lateral separation and so resist twisting.

Figure 3:
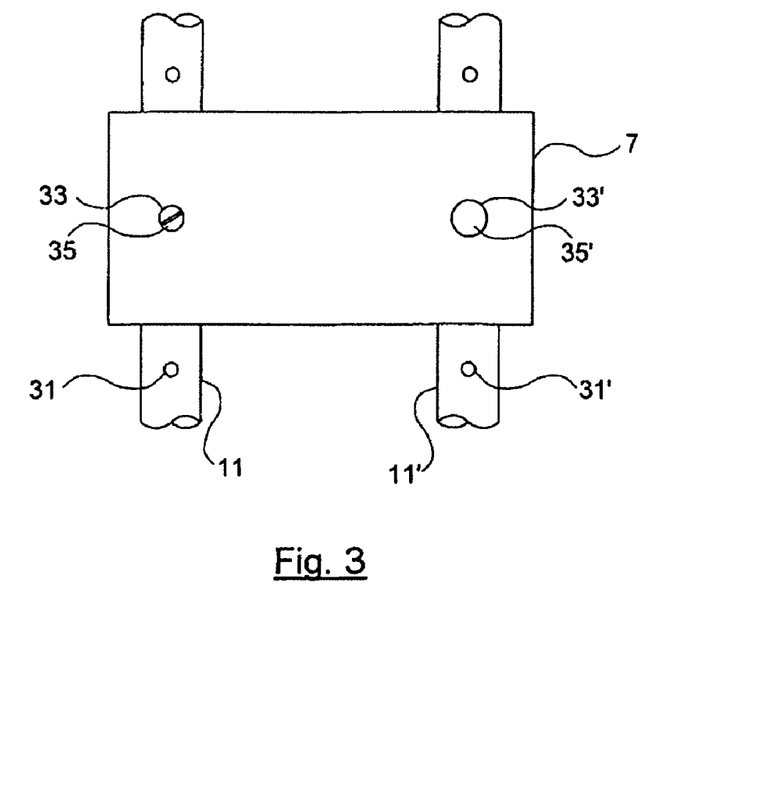
FIG. 3 is a schematic front view of a frame bracket and alternate stops.

The extendible actuators, such as screw actuator 19, provide substantially infinite adjustment of the vertical position of the furrow opener 3. If such is not required, as schematically illustrated in FIG. 3 the stop 15 could comprise a plurality of recesses 31 in the shaft 11, and a corresponding threaded bracket aperture 33 in the bore bracket 7. A threaded pin 35 could be threaded into the bracket aperture 33 into one of the recesses 31 to fix the shaft 11 with respect to the bore bracket 7. Alternately, recesses 31' extend through the shaft 11' and a pin 35' passes through a corresponding bracket aperture 33' that passes through both sides of the bore bracket 7.

The illustrated furrow opener 3 comprises an opener arm 41 pivotally attached at an upper portion thereof to the opener bracket 13 about a substantially horizontal pivot axis PA oriented substantially perpendicular to the operating travel direction provided by pivot pin 43. A furrow opening element 45 is attached at a lower end of the opener arm 41.

Conveniently in the embodiment illustrated in FIGS. 1 and 2 a bias element, spring 47, is attached to the upper shaft bracket 17 and the top end of the opener arm 41. The spring 47 is in tension pulling up on the opener arm 41 ahead of the pivot axis PA such that a downward force is exerted on the furrow opening element 45.

Figure 4:
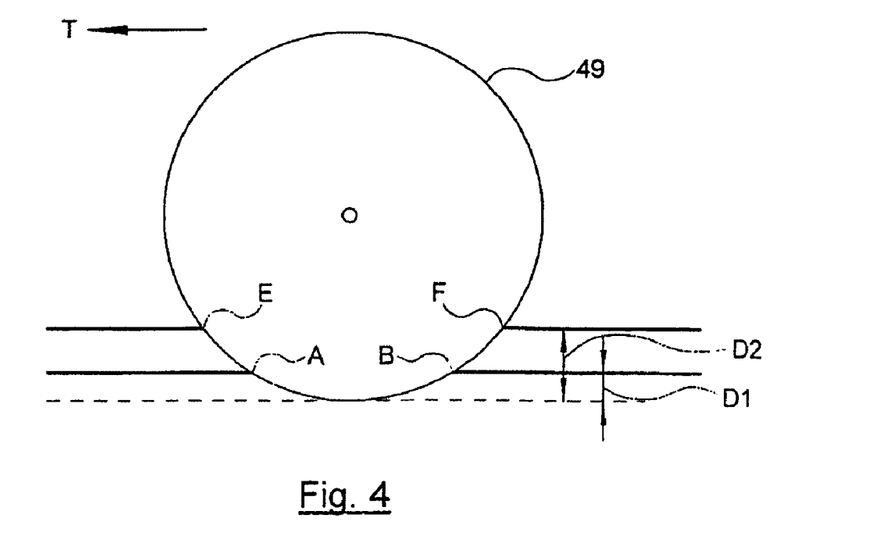
FIG. 4 is a schematic side view of a disc furrow opener engaging the ground.
Figure 5:
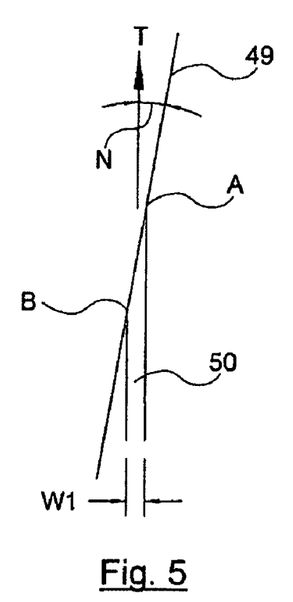
FIG. 5 is a schematic top view of the disc furrow opener penetrating the ground at a shallow depth.
Figure 6:
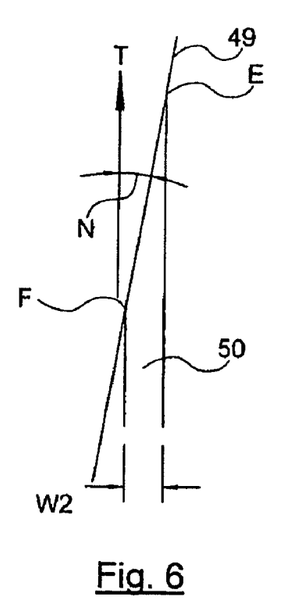
FIG. 6 is a schematic top view of the disc furrow opener penetrating the ground at a deeper depth.
Figure 7:
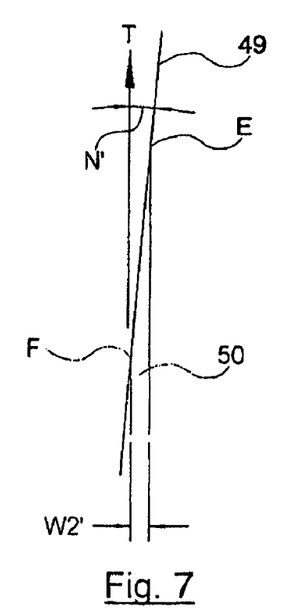
FIG. 7 is a schematic top view of the disc furrow opener penetrating the ground at the depth of FIG. 6, but with a reduced operating angle.

In the embodiment of FIGS. 1 and 2 the furrow opening element comprises a rotatable disc 49. The apparatus 1 of the invention provides a particular advantage in using disc furrow openers, as schematically illustrated in FIGS. 4-7. FIG. 4 is a side view of a disc 49. FIGS. 5-7 are top views of the disc 49.

When penetrating the ground to a depth D1, the disc 49 enters the ground at A and leaves the ground at B, and will create a furrow 50 that has a width W1 as seen in FIG. 5. When penetrating the ground to a greater depth D2, the disc 49 enters the ground at E and leaves the ground at F, and will thus create a furrow 50 that has a width W2 as seen in FIG. 6 that is considerably wider than the width W1. The operating angle N with respect to the operating travel direction T is the same in FIGS. 5 and 6 as in conventional disc furrow openers.

Figure 8:
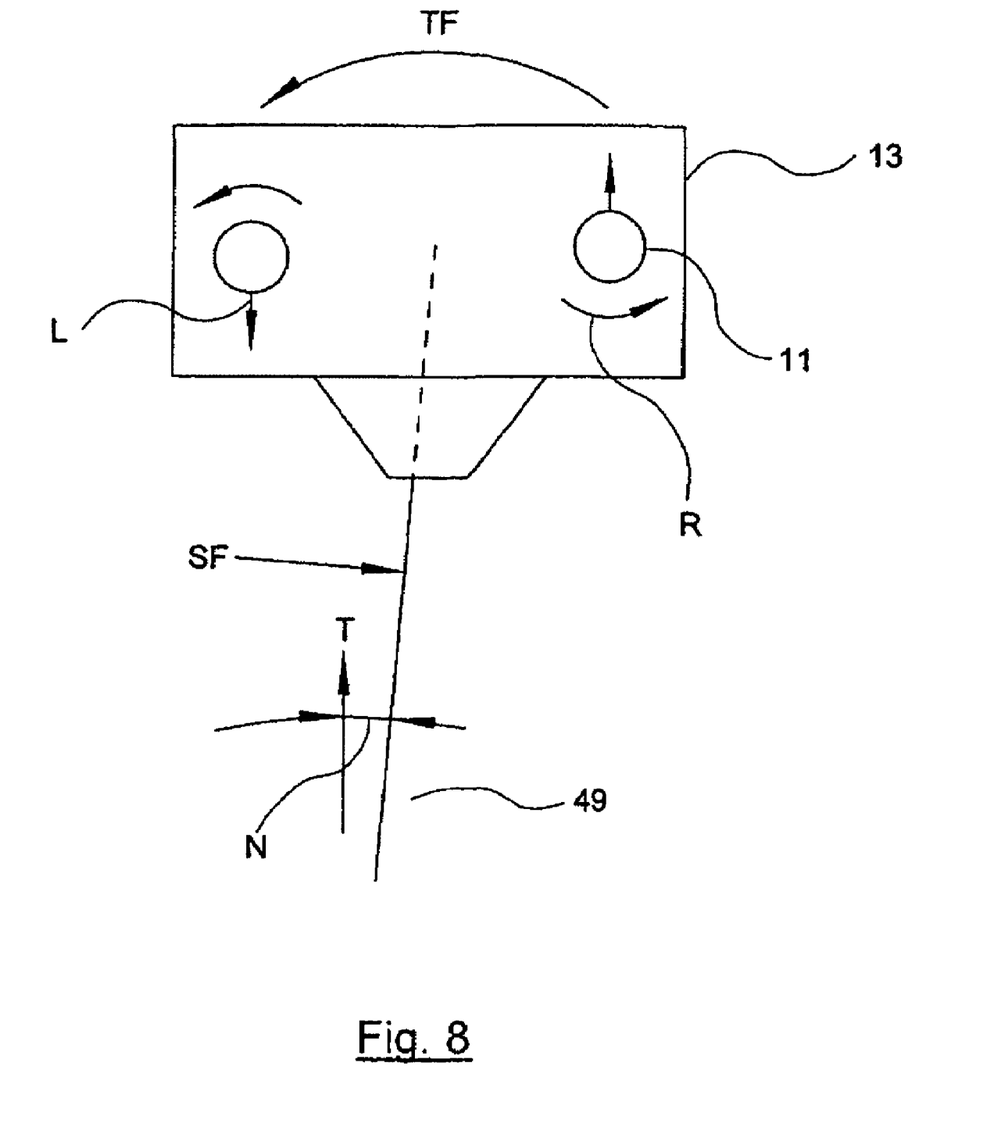
FIG. 8 is a schematic top view of the disc furrow opener penetrating the ground and indicating soil force and resulting twisting force exerted on the disc, shafts, and opener bracket.

FIG. 8 is a schematic top view of the disc 49, opener bracket 13, and shafts 11. FIG. 8 illustrates the force SF exerted by the soil on the disc 49 when it engages the ground in operating travel direction T, and the resulting twisting force TF exerted on the opener bracket 13 and shafts 11 which tends to reduce the operating angle N so that the disc 49 would run straighter and the soil force SF would be reduced. Conventionally the implement is constructed to totally resist this twisting force TF and maintain a constant angle N through the normal working range of furrow depths.

The furrow 50 should generally be wide enough so that the seed and fertilizer can be effectively introduced into the furrow and fall to the bottom thereof. The furrow 50 created at the greater penetration depth D2 in FIG. 6 is excessively wide, moving more soil than is required and thus causing increased soil disturbance that is undesirable in minimum tillage seeding operations. Moving excessive soil also increases the power required to pull the furrow opener through the soil, wasting energy.

In the apparatus of the invention, the shafts 11 can be configured so that as the penetration depth increases the shafts 11 will deflect somewhat in response to the twisting force TF so that the operating angle of the disc 49 will be reduced to N' as illustrated in FIG. 7 and the furrow width will be reduced to W2'. The shaft deflection is indicated by arrow R as rotational movement and arrow L as lateral movement of the shafts 11 with respect to the implement frame, which is substantially fixed and moving in the operating travel direction T.

As the shafts 11 are moved down with respect to the frame 5 to increase the penetration depth, that portion of the shafts 11 that is sticking out below the bores 9 increases, thus increasing the leverage exerted on the shafts 11 by the twisting force TF, and further facilitating deflection of the shafts 11 with respect to each other, and a greater reduction in the operating angle N. With some experimentation and by varying the diameter, separation, and length of the shafts 11, a configuration can be provided that is suitable for an average range of conditions, or for any special condition desired.

Figure 9:
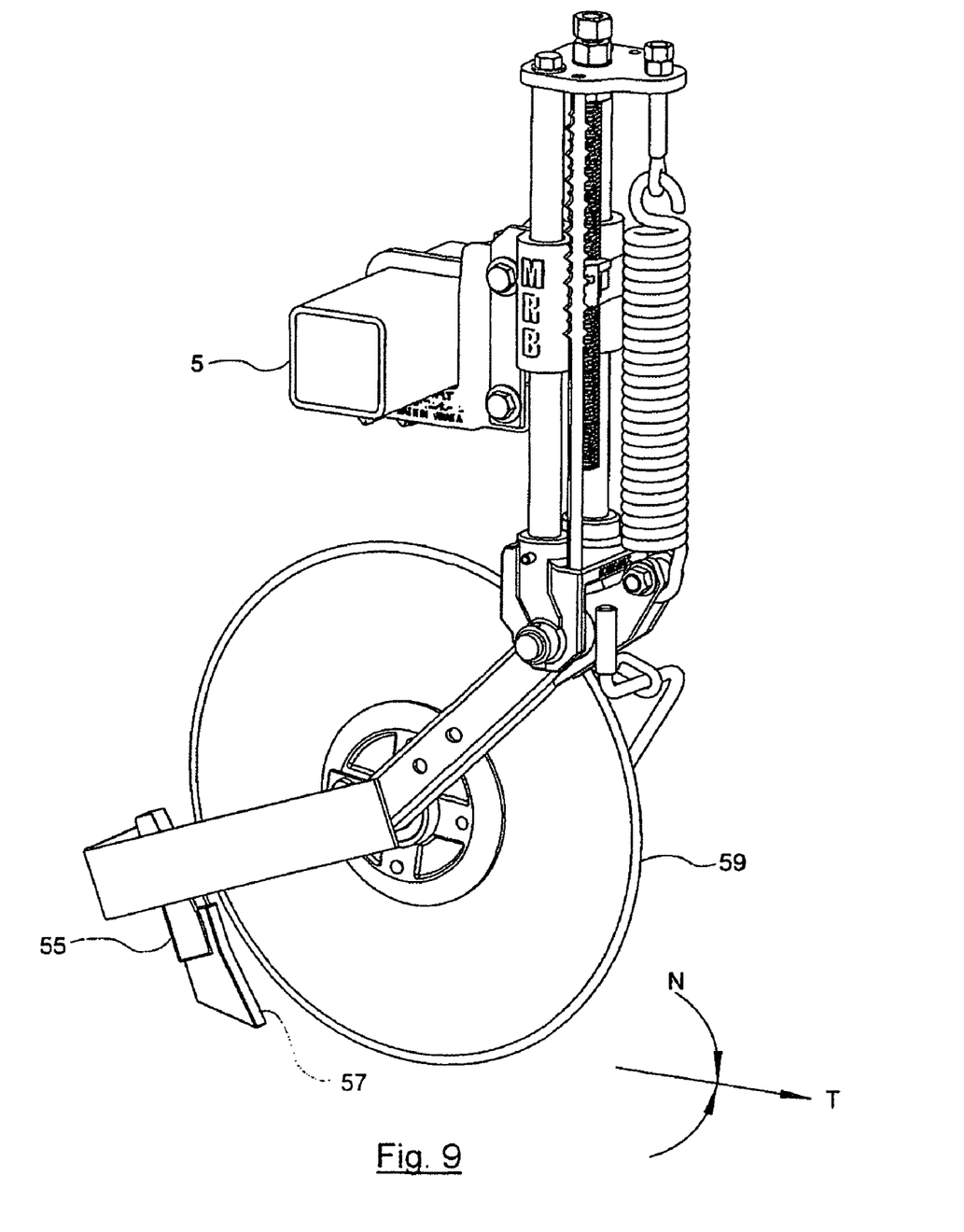
FIG. 9 is a front perspective view of an embodiment of the invention in use to mount a hoe-type furrow opener.

FIG. 9 illustrates an embodiment of the apparatus being used to attach a hoe-type furrow opener 55 to the implement frame 5. Typically such hoe openers 55 are oriented to operate at an operating angle N of zero degrees such that the hoe opener is maintained square to the operating travel direction. Alternately, if a hoe opener was designed to operate at some other angle the apparatus can be readily configured to maintain substantially any operating angle. In the illustrated embodiment the furrow opener 55 comprises a narrow hoe opener 57 or knife following a rotatable disc 59. The illustrated disc 59 is oriented at an operating angle of zero degrees so that same operates as a coulter disc to cut through trash and allow the following narrow hoe opener 57 to make a narrow furrow without gathering trash.

FIG. 10 schematically illustrates an alternate implement apparatus comprising an implement frame 105 wherein first and second cylindrical shafts 111 are fixed to the implement frame 105 such that the shafts 111 are parallel to each other and extend downward from the implement frame 105 in a substantially upright orientation. A bore bracket 107 defines a pair of laterally spaced parallel cylindrical bores 109 slidingly engaged on the shafts 111 such that the bore bracket 107 can slide along the shafts 111. An adjustable stop 115, such as a pin through corresponding apertures in the bore bracket 107 and one of the shafts 111, is operative to prevent the bore bracket 107 from sliding along the shafts 111. An actuator similar to those described above could also be used to provide the stop.

In the illustrated embodiment a furrow opener 103 is attached to the bore bracket 107. The furrow opener 103 comprises an opener arm 141 pivotally attached at an upper portion thereof to the bore bracket 107 about a substantially horizontal pivot axis PA oriented substantially perpendicular to the operating travel direction T, and attached at a lower portion thereof to a furrow opening element, illustrated as a rotatable disc 149. A bias element, compression spring 147, is attached to the bore bracket 107 and the opener arm 141 and is operative to exert a downward force on the disc 149. The depth of penetration of the furrow opener 103 into the ground is adjusted by adjusting the stop 115 to change a position of the bore bracket 107 with respect to the shafts 111.

Figure 11:
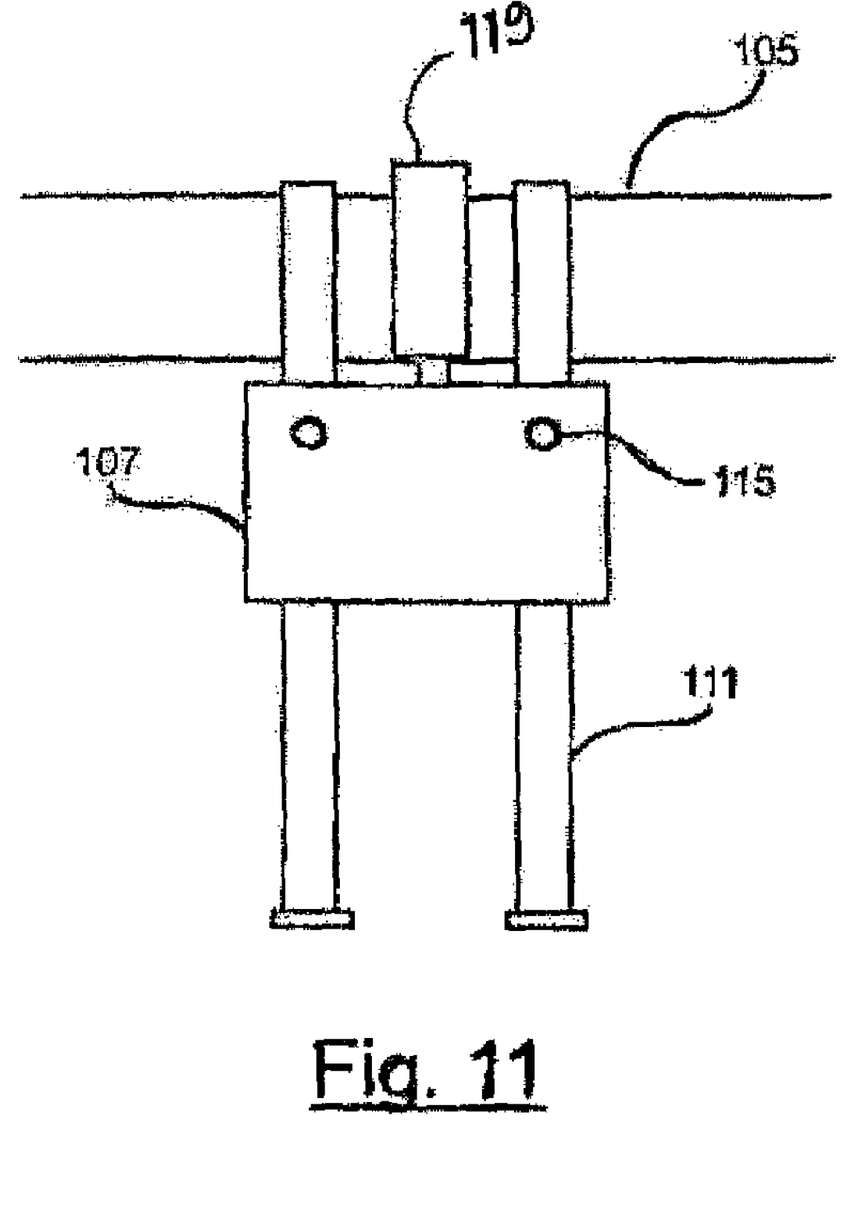
FIG. 11 is a schematic front view of the embodiment of FIG. 10.

As above, the shafts 111 can be configured to deflect as the disc 149 moves further into the ground, thereby reducing the operating angle. FIG. 11 schematically illustrates a front view of the implement frame 105, bore bracket 107, shafts 111, and stop 115 of FIG. 10.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An apparatus attaching a ground-engaging tool to an implement frame of an implement adapted to move along the ground in an operating travel direction, the apparatus comprising:

a bore bracket defining a pair of laterally spaced parallel cylindrical bores;

a pair of cylindrical shafts, one shaft slidingly engaged in each bore such that the shafts are maintained in a parallel orientation, wherein the shafts are connected such that the shafts slide in the bores substantially in unison;

wherein the bore bracket is adapted for rigid attachment to the implement frame such that the bores and shafts are oriented substantially upright, and the pair of shafts is attached to the ground-engaging tool; and an actuator oriented substantially parallel to the shafts and attached to the bore bracket at a location substantially mid-way between the shafts, and attached to both of the shafts wherein the actuator is operative, when activated, to selectively exert a force between the bore bracket and the shafts to move the shafts up and down with respect to the bore bracket, and the actuator is operative, when inactive, to fix the shafts at a desired position with respect to the bores such that the shafts are prevented from sliding up and down in the bores when the attached ground-engaging tool is engaged in the ground.

2. The apparatus of claim 1 wherein the actuator comprises one of a screw actuator and an extendable cylinder actuator.

3. The apparatus of claim 2 wherein the actuator can be remotely activated.

4. The apparatus of claim 1 wherein the ground-engaging tool comprises a furrow opener with a ground-engaging furrow opening element attached at a lower portion of the apparatus such that the furrow opening element is substantially oriented at an operating angle with respect to the operating travel direction.

5. The apparatus of claim 4 wherein an opener bracket is attached to lower ends of the shafts, and wherein the furrow opener further comprises an opener arm pivotally attached at an upper portion thereof to the opener bracket about a substantially horizontal pivot axis oriented substantially perpendicular to the operating travel direction and wherein the furrow opening element is attached to a lower portion of the opener arm.

6. The apparatus of claim 5 further comprising an upper shaft bracket attached to upper portions of both shafts, and wherein the actuator is attached to both of the shafts by attachment to the upper shaft bracket substantially mid-way between the shafts, and a bias element attached to the upper shaft bracket and the opener arm and operative to exert a downward force on the furrow opening element.

7. The apparatus of claim 4 wherein the furrow opener comprises a rotatable disc.

8. The apparatus of claim 7 wherein the shafts are configured to deflect as the disc moves further into the ground, thereby reducing the operating angle.

9. The apparatus of claim 4 wherein the furrow opener comprises a hoe opener.

10. The apparatus of claim 9 wherein the furrow opener comprises a narrow hoe opener following a rotatable disc.

11. An agricultural implement apparatus adapted to move along the ground in an operating travel direction, the apparatus comprising:
an implement frame comprising a frame bore member defining first and second laterally spaced parallel cylindrical bores oriented substantially upright;
a first cylindrical shaft slidingly engaged in the first bore and a second cylindrical shaft slidingly engaged in the second bore such that the shafts are maintained in a parallel, substantially upright orientation;
a furrow opener;
an opener bracket attached to a lower portion of the first shaft and attached to a lower portion of the second shaft such that the first and second shafts slide in the bores in unison, and attached to the furrow opener such that the furrow opener is substantially oriented at an operating angle with respect to the operating travel direction; and
an actuator oriented substantially parallel to the shafts and attached to the opener bracket at a location substantially mid-way between the shafts and attached to the frame bore member at a location substantially mid-way between the shafts, wherein the actuator is operative, when activated, to selectively exert a force between the opener bracket and the frame bore member to move the shafts up and down with respect to the frame bore member, and the actuator is operative, when inactive, to fix the shafts at a desired position with respect to the bores such that the shafts are prevented from sliding up and down in the bores when the furrow opener is engaged in the ground;
wherein a depth of penetration of the furrow opener into the ground is adjusted by activating the actuator to change a position of the shafts with respect to the frame bore member.

12. The apparatus of claim 11 wherein the furrow opener comprises an opener arm pivotally attached at an upper portion thereof to the opener bracket about a substantially horizontal pivot axis oriented substantially perpendicular to the operating travel direction, and attached at a lower portion thereof to a furrow opening element and comprising a bias element operative to exert a downward force on the furrow opening element.

13. The apparatus of claim 11 wherein the furrow opening element is a rotatable disc and wherein the shafts are configured to deflect as the disc moves further into the ground, thereby reducing the operating angle.

14. An agricultural implement apparatus adapted to move along the ground in an operating travel direction, the apparatus comprising:
an implement frame;
first and second cylindrical shafts fixed to the implement frame such that the shafts are parallel to each other and extend downward from the implement frame in a substantially upright orientation;
a bore bracket defining first and second laterally spaced parallel cylindrical bores and slidingly engaged on the shafts such that the first shaft is in the first bore and the second shaft is in the second bore and the bore bracket can slide along the shafts;
an actuator oriented substantially parallel to the shafts and attached to the bore bracket at a location substantially mid-way between the shafts and attached to the implement frame at a location substantially mid-way between the shafts, wherein the actuator is operative, when activated, to selectively exert a force between the bore bracket and the implement frame to move the bore bracket up and down with respect to the shafts, and the actuator is operative, when inactive, to fix the bore bracket at a desired position with respect to the shafts such that the bore bracket is prevented from sliding up and down on the shafts when the furrow opener is engaged in the ground;
a furrow opener attached to the bore bracket such that the furrow opener is substantially oriented at an operating angle with respect to the operating travel direction;
wherein a depth of penetration of the furrow opener into the ground is adjusted by activating the actuator to change a position of the bore bracket with respect to the shafts.

15. The apparatus of claim 14 wherein the furrow opener comprises an opener arm pivotally attached at an upper portion thereof to the bore bracket about a substantially horizontal pivot axis oriented substantially perpendicular to the operating travel direction, and attached at a lower portion thereof to a furrow opening element, and comprising a bias element attached to the bore bracket and the opener arm and operative to exert a downward force on the furrow opening element.

16. The apparatus of claim 14 wherein the furrow opening element is a rotatable disc and wherein the shafts are configured to deflect as the disc moves further into the ground, thereby reducing the operating angle.

17. A ground-engaging tool apparatus for attachment to an implement frame of an implement adapted to move along the ground in an operating travel direction, the apparatus comprising:
- a bore bracket defining a pair of laterally spaced parallel cylindrical bores, the bore bracket adapted for rigid attachment to the implement frame such that the bores are oriented substantially upright;
- a pair of cylindrical shafts, one shaft slidingly engaged in each bore such that the shafts are maintained in a parallel orientation, wherein the shafts are attached at lower ends thereof to a ground-engaging tool, and are attached at upper ends thereof to an upper shaft bracket such that the shafts slide in the bores substantially in unison;
- an actuator oriented substantially parallel to the shafts and attached to the bore bracket at a location substantially mid-way between the shafts, and attached to the upper shaft bracket at a location substantially mid-way between the shafts wherein the actuator is operative to selectively exert a force between the bore bracket and the upper shaft bracket to move the shafts up and down with respect to the bore bracket, and the actuator is operative to fix the shafts at a desired position with respect to the bores such that the shafts are prevented from sliding up and down in the bores when the ground-engaging tool is engaged in the ground.

18. The apparatus of claim 17 wherein the actuator comprises one of a screw actuator and an extendable cylinder actuator.

19. The apparatus of claim 17 wherein the ground engaging tool is a rotatable furrow opening disc and wherein the shafts are configured to deflect as the disc moves further into the ground, thereby reducing an operating angle of the disc.

\* \* \* \* \*